United States Patent
Okawa et al.

(10) Patent No.: US 6,430,225 B1
(45) Date of Patent: Aug. 6, 2002

(54) APPARATUS AND METHOD FOR DIGITAL DATA TRANSMISSION

(75) Inventors: Sumihiro Okawa; Akira Nakamura, both of Kanagawa; Hiroshi Takizuka; Takahiro Fujimori, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/043,485

(22) PCT Filed: Jul. 18, 1997

(86) PCT No.: PCT/JP97/02511

§ 371 (c)(1),
(2), (4) Date: Jun. 12, 1998

(87) PCT Pub. No.: WO98/04068

PCT Pub. Date: Jan. 29, 1998

(30) Foreign Application Priority Data

Jul. 19, 1996 (JP) ............................................. 8-209185
Apr. 11, 1997 (JP) ............................................. 9-094221

(51) Int. Cl.⁷ ............................ H04L 12/40; H04B 1/38
(52) U.S. Cl. ........................ 375/242; 375/219; 375/377; 370/423
(58) Field of Search ................................. 375/219, 220, 375/222, 241, 242, 377; 370/420, 423, 424; 710/129

(56) References Cited

U.S. PATENT DOCUMENTS 5,349,654 A * 9/1994 Bond et al. .................... 714/45
5,644,577 A * 7/1997 Christensen et al. ......... 370/506
5,719,862 A * 2/1998 Lee et al. ..................... 370/355
5,923,654 A * 7/1999 Schnell ........................ 370/390
6,061,360 A * 5/2000 Miller et al. ................. 370/455

FOREIGN PATENT DOCUMENTS

| EP | 0 596 645 | 5/1994 |
| JP | 3-263946 | 11/1991 |
| JP | 3-297236 | 12/1991 |
| JP | 6-85847 | 3/1994 |
| WO | WO 96/18254 | 6/1996 |

OTHER PUBLICATIONS

Okawa et al., Pub. No.: US2002/0010824 A1, Pub. Date: Jan. 24, 2002.*

* cited by examiner

Primary Examiner—Young T. Tse
(74) Attorney, Agent, or Firm—Frommer Lawrence & Haug LLP; William S. Frommer; Bruno Polito

(57) ABSTRACT

There is provided a converting processing block 3 for carrying out a processing to convert an arbitration signal into code data of 5 bits and for carrying out 4 bit/5 bit converting processing with respect to packet data to thereby carry out transmission/reception of arbitration signal and packet data as code data of 5 bits through transmitting blocks 6A, 6B and receiving blocks 7A, 7B. Thus, there is realized an interface apparatus for digital serial data which realizes extension of cable length between nodes in the digital serial data interface (e.g., IEEE 1394 high performance serial bus standard) adapted for carrying out arbitration of bus use right prior to transfer of data, thus to permit long distance transmission.

44 Claims, 11 Drawing Sheets

REQUEST FOR BUS USE RIGHT

PERMISSION OF BUS USE

APPARATUS AND METHOD FOR DIGITAL DATA TRANSMISSION

TECHNICAL FIELD

This invention relates to a transmission apparatus for carrying out transmission of digital data, and a method therefor.

BACKGROUND ART

As the interface standard which has supported high speed data transfer and real time transfer with a view to realization of interface for data transfer, IEEE 1394 high performance serial bus standard (hereinafter referred to as IEEE 1394 standard) is known.

In this IEEE 1394 standard, data transfer rates (speeds) at 100 Mbps (98.304 Mbps), 200 Mbps (196.608 Mbps) and 400 Mbps (393.216 Mbps) are prescribed. The 1394 port having high order transfer rate is prescribed so as to hold compatibility with the low order transfer rate thereof. Thus, data transfer rates of 100 Mbps, 200 Mbps and 400 Mbps can exist in mixed state on the same network. Moreover, in the IEEE 1394 standard, as shown in FIG. 1, there is employed transfer format of the DS-Link (Data/Strobe Link) coding system such that transfer data is converted into two signals of data signal and strobe signal for compensating that signal to take Exclusive logical sum of these two signals so that clock can be generated. Further, as the cable structure is shown in the cross sectional view of FIG. 2, there is prescribed a cable 200 of the structure in which the entirety of cable in which two sets of twist pair lines (signal lines) 202 shielded by respective first shield layers 201 and power lines 203 are bundled is further shielded by a second shield layer 204.

Moreover, in the connection system in the IEEE 1394 standard, two kinds of systems of the daisy chain and the node branch can be used. In the daisy chain system, 16 nodes (equipment having the 1394 port) at the maximum can be connected and the longest distance between respective nodes is set to 4.5 m. As shown in FIG. 3, by using the node branch in combination, as far as 63 nodes (physical node addresses) which is the maximum in the standard can be connected.

Further, in .the IEEE 1394 standard, plug-in/plug-out of the cable of the structure as described above can be carried out in the state where the equipment is operative, i.e., the state where power is turned ON. At the time point when node is supplemented on deleted, reconstruction of the 1394 network is automatically carried out. At this time, equipments of the connected nodes can be automatically recognized, and IDs and/or arrangement of the connected equipments are caused to undergo management on the interface.

The components and the protocol architecture of the interface in conformity with the IEEE 1394 standard are shown in FIG. 4. The interface of the IEEE 1394 standard can be classified into hardware and firmware.

The hardware consists of physical layer (PHY) and link layer.

Further, in the physical layer, signal of the IEEE 1394 standard is directly driven. In addition, the link layer comprises interface between host interface and physical layer.

The firmware consists of transaction layer consisting of management driver for carrying out actual operation with respect to interface in conformity with the IEEE 1394 standard and management layer consisting of driver for management of network in conformity with the IEEE 1394 standard which is called SBM (Serial Bus Management).

Further, application layer consists of software that user uses and management software which interfaces with the transaction layer or the management layer.

In the IEEE 1394 standard, transfer operation carried out within the network is called subaction and the following two kinds of subactions are prescribed. Namely, as two subactions, the asynchronous transfer mode called "asynchronous" and synchronous transfer mode which has guaranteed transfer band called "isochronous" are defined. Further, respective subactions are classified into the following three parts to take transfer states called "arbitration", "packet transmission" and "acknowledgment".

In the asynchronous subaction, the asynchronous transfer is carried out. In FIG. 5 showing the transition state in point of time in this transfer mode, the first subaction gap indicates the idle state of bus. By monitoring time of this subaction gap, whether or not new transfer can be carried out after transfer immediately before is completed is judged.

Further, when idle state of predetermined time or more lasts, the node which desires to carry out transfer judges that the bus can be used to execute arbitration for acquiring the control right of bus. In practice, judgment of stop of bus is carried out by node B positioned at the route as shown in FIGS. 6(a), (b). The node which has obtained the control right of bus by such arbitration then executes transfer of data, i.e., packet transmission. After the data transfer, the node which has received data executes responsive acknowledgment by sending back of ack (sending back code for confirmation of reception) corresponding to that reception result with respect to the transferred data. By execution of this acknowledgment, it can be confirmed by the content of the ack that transfer has been normally carried out along with transmission and reception nodes.

Thereafter, the system state returns to the subaction gap, i.e., idle state of bus for a second time. Thus, transfer operation as described above is repeated.

Moreover, in the isochronous subaction, transfer of the structure similar to the asynchronous transfer is essentially carried out. As shown in FIG. 7, transfer in this case is executed preferentially to the asynchronous transfer at the asynchronous subaction. The isochronous transfer in this isochronous subaction is executed preferentially to the asynchronous transfer at the asynchronous subaction every about 8 kHz, thereby resulting in the transfer mode which has guaranteed transfer band. Thus, transfer of real time data is realized.

In the case of carrying out isochronous transfer of real time data at plural nodes at the same time, channel ID for distinguishing the content (sending node) is set at that transfer data to receive only necessary real time data.

The physical layer in the IEEE 1394 standard as described above consists, as shown in FIG. 8, for example, of a physical layer logic block (PHY LOGIC) 102, a selector block (RXCLOCK/DATA SELECTOR) 103, respective port logic blocks (PORT LOGIC 1, PORT LOGIC 2, PORT LOGIC 3) 104, 105, 106, respective cable ports (CABLE PORT 1, CABLE PORT 2, CABLE PORT 3) 107, 108, 109, and a clock generating block (PLL) 110.

The physical layer logic block 102 serves to carry out I/O control and arbitration control to and from link layer in the IEEE 1394 standard, and is connected to a link layer controller 100 and is connected to the selector block 103 and the respective port logic blocks 104, 105, 106.

The selector block 103 serves to carry out selection of data (DATA1, DATA2, DATA3) and their receiving clocks (RXCLK1, RXCLK2, RXCLK3) received through logic blocks 104, 105, 106 connected to the respective cable ports 107, 108, 109, and is connected to the physical layer logic block 102 and the respective port logic blocks 104, 105, 106.

In the case of transmission of data, this selector block 103 sends, to all port logic blocks 104, 105, 106, packet data (DATA) sent from the physical layer logic block 102. Moreover, in the case of reception, the selector block 103 selects one set of packet data (DATA1, DATA2, DATA3) and their receiving clocks (RXCLK1, RXCLK2, RXCLK3) received through the respective port logic blocks 104, 105, 106 to send, to the physical layer logic block 102, packet data and their receiving clocks received through the cable ports 107, 108, 109. For example, in the case where the selector block 103 selects packet data (DATA1) and its receiving clock (RXCLK1) received through the port logic block 104, the selector block 103 sends, to the physical layer logic block 102, packet data (DATA1) and its receiving clock (RXCLK1) that the port logic block 104 has received through the cable port 107. Then, packet data selected by the selector block 103 is written into FIFO memory within the physical layer logic block 102 by its receiving clock. The packet data which has been written into this FIFO memory is read out by system clock (SYSCLK) given by the clock generating block 110.

The port logic block 104 serves to carry out transmission/reception of arbitration signal (ARB.SIGNAL) and data (DATA1) through the cable port 107, and has a function to generate receiving clock (RXCLK1) from data signal and its strobe signal sent through the cable port 107. Moreover, at the time of arbitration, arbitration signal (ARB.SIGNAL) is sent from the physical layer logic block 102 to the port logic block 104.

Further, at the time of transmission of data, this port logic block 104 converts packet data (DATA1) sent through the selector block 103 from the physical layer logic block 102 into serial data by transmitting clock (TXCLK) given by the clock generating block 110 to transmit it from the cable port 107.

In addition, at the time of reception of data, this port logic block 104 sends, to the physical layer logic block 102 through the selector block 103, packet data (DATA1) received through the cable port 107 along with its receiving clock (RXCLK1). Further, in the case where this port logic block 104 is selected by the selector block 103, packet data (DATA1) is written into FIFO memory within the physical layer logic block 102 by its receiving clock (RXCLK1).

The port logic block 105 serves to carry out transmission/reception of arbitration signal (ARB.SIGNAL) and data (DATA2) through the cable port 108, and has a function to generate receiving clock (RXCLK2) from data signal and its strobe signal sent through the cable port 108. In addition, at the time of arbitration, arbitration signal (ARB.SIGNAL) is sent from the physical layer logic block 102 to the port logic block 105.

Further, at the time of transmission of data, this port logic block 105 converts packet data (DATA2) sent through the selector block 103 from the physical layer logic block 102 into serial data by transmitting clock (TXCLK) given by the clock generating block 110 to transmit it from the cable port 108.

Further, at the time of reception of data, this port logic block 105 sends packet data (DATA2) received through the cable port 108 to the physical layer logic block 102 through the selector block 103 along with its receiving clock (RXCLK2). Further, in the case where this port logic block 105 is selected by the selector block 103, packet data (DATA2) is written into FIFO memory within the physical layer logic block 102 by its receiving clock RXCLK2.

The port logic block 106 serves to carry out transmission/reception of arbitration signal (ARB.SIGNAL) and data (DATA3) through the cable port 109, and has a function to generate receiving clock (RXCLK3) from data signal and its strobe signal sent through the cable port 109. In addition, at the time of arbitration, arbitration signal (ARB.SIGNAL) is sent from the physical layer logic block 102 to the port logic block 106.

Further, at the time of transmission of data, this logic block 106 converts packet data (DATA3) sent through the selector block 103 from the physical layer logic block 102 into serial data by transmitting clock (TXCLK) given by the clock generating block 110 to transmit it from the cable port 109.

Further, at the time of reception of data, this port logic block 106 sends, to the physical layer logic block 102 through the selector block 103, packet data (DATA3) received through the cable port 109 along with its receiving clock (RXCLK3). In addition, in the case where this port logic block 104 is selected by the selector block 103, packet data (DATA1) is written into FIFO memory within the physical layer logic block 102 by its receiving clock (RXCLK1).

The cable port 107 drives the twist pair cable by signal sent from the port logic block 104, and carries out level conversion of signal sent through the twist pair cable to send it to the port logic block 104.

The cable port 108 drives the twist pair cable by signal sent from the port logic block 105, and carries out level conversion of signal sent through the twist pair cable to send it to the port logic block 105.

The cable port 109 drives the twist pair cable by signal sent from the port logic block 106, and carries out level conversion of signal sent through the twist pair cable to send it to the port logic block 106.

The clock generating block 110 generates system clock (SYSCLK) of 49.152 MHz and transmitting clock (TXCLK) of 98.304 MHz from clock of 24.576 MHz given by a crystal oscillator 111.

The logical values of the arbitration signal in the physical layer is ternary (values) of "1", "0", "Z". These ternary values are generated in accordance with the rule shown in the following Tables 1 and 2, and are decoded by the rule shown in Table 3. In this case, the value "Z" indicates inoperative state of driver.

In this case, the first set of twist pair lines TPA/TPA of two sets of twist pair lines 202 transmit strobe signal (Strb_Tx), and receive data signal(Data_Rx). On the other hand, the second set of twist pair lines TPB/TPB* transmit data signal (Data_Tx) and receive strobe signal (Strb_Rx). The Strb_Tx signal, the Data_Tx signal, Strb_Enable signal and Data_Enable signal are used for generating arbitration signals (Arb_A_Rx, Arb_B_Rx).

TABLE 1

Arbitration Signal Generation Rule

| Transmit Arbitration Signal A (Arb_A_Tx) | Driver | | Note |
|---|---|---|---|
| | Strb_Tx | Strb_Enable | |
| Z | — | 0 | TPA driver: Inoperative |
| 0 | 0 | 1 | TPA driver: Operative, TPA strobe: Low |
| 1 | 1 | 1 | TPA driver: Operative, TPA strobe: High |

TABLE 2

Arbitration Signal Generation Rule

| Transmit Arbitration Signal B (Arb_B_Tx) | Driver | | Note |
|---|---|---|---|
| | Data_Tx | Data_Enable | |
| Z | — | 0 | TPB driver: Inoperative |
| 0 | 0 | 1 | TPB driver: Operative, TPB data: Low |
| 1 | 1 | 1 | TPB driver: Operative, TPA data: High |

TABLE 3A

Arbitration Signal Decode Rule

| Received Arbitration Comparative Value (Arb_n_Rx) | Arbitration Signal Being Transmitted From Corresponding Port (Arb_n_Tx) | Interpolated Arbitration Signal (Arb_n) | Note "n" is "A" or "B". This Table is applied to both signal pair. |
|---|---|---|---|
| Z | Z | Z | If this port is transmitting Z, receive signal is identical to signal transmitted by port of cable other end. |
| 0 | Z | 0 | |
| 1 | Z | 1 | |

TABLE 3B

Arbitration Signal Decode Rule

| Received Arbitration Comparative Value (Arb_n_Rx) | Arbitration Signal Being Transmitted From Corresponding Port (Arb_n_Tx) | Interpolated Arbitration Signal (Arb_n) | Note "n" is "A" or "B". This Table is applied to both signal pair |
|---|---|---|---|
| Z | 0 | 1 | If comparator is receiving Z for a time period during which this port is transmitting 0, other ports are sending 1 |
| 0 | 0 | 0 | Other ports are sending 0 or Z |

TABLE 3C

Arbitration Signal Decode Rule

| Received Arbitration Comparative Value (Arb_n_Rx) | Arbitration Signal Being Transmitted From Corresponding Port (Arb_n_Tx) | Interpolated Arbitration Signal (Arb_n) | Note "n" is "A" or "B". This Table is applied to both signal pair. |
|---|---|---|---|
| Z | 1 | 1 | Other ports are sending 0 |
| 1 | 1 | 1 | Other ports are sending 1 or Z |

Moreover, in the physical layer, the rule shown in the following Table 4 is used to encode two transmission arbitration signals (Arb_A_Tx, Arb_B_Tx) so that they are placed in line state. As shown in the Table 4, these states have meanings different in dependency upon whether corresponding signal is sent to the parent node or the child node.

The parent/child relationship in the IEEE 1394 standard will now be described. Among plural nodes connected to the network, there exist several nodes positioned at the ends (leaves). Immediately after bus reset, respective nodes judge whether or not the nodes themselves are leaves. Judgments as to whether or not respective nodes are leaves are carried out by recognizing how many cables are connected to respective corresponding nodes. Namely, node having only one port or node to which only one cable is connected even if it has plural ports will be leaf. Respective leaves carry out inquiry with respect to node of destination of connection (parent node). The node which has received the inquiry allows the node from which inquiry has been issued, connected to the port to which inquiry has been issued to be child to further carry out inquiry with respect to destination of connection from the port in which the parent/child relation has been not yet determined. In this way, the parent/child relationship within the network is determined. Ultimately, the node in which all ports have been caused to be parent serves as route.

TABLE 4A

Line State of Arbitration Transmitted in Physical Layer

| Arbitration Transmission | | Line State | |
|---|---|---|---|
| Arb_A_Tx | Arb_B_Tx | Name | Note |
| Z | Z | IDLE | Transmitted to indicate a gap |
| Z | 0 | TX_REQUEST | Transmitted to parent node to request the bus |
| | | TX_GRANT | Transmitted to child node when bus is granted |

TABLE 4B

Line State of Arbitration Transmitted in Physical Layer

| Arbitration Transmission | | Line State | |
|---|---|---|---|
| Arb_A_Tx | Arb_B_Tx | Name | Note |
| 0 | Z | TX_PARENT_NOTIFY | Transmitted to parent node candidate in Tree-ID phase |
| 0 | 1 | TX_DATA_PREFIX | Transmitted before packet data or between packet data of connected subaction |

TABLE 4C

Line State of Arbitration Transmitted in Physical Layer

| Arbitration Transmission | | Line State | |
|---|---|---|---|
| Arb_A_Tx | Arb_B_Tx | Name | Note |
| 1 | Z | TX_CHILD_NOTIFY | Transmitted to child node to acknowledge PARENT NOTIFY |
| | | TX_IDENT_DONE | Transmitted to parent node to indicate that self-ID phase has been completed |
| 1 | 0 | TX_DATA_END | Transmitted when packet transfer is completed |
| 1 | 1 | BUS_RESET | Transmitted to reconstruct bus |

In the physical layer, interpolation arbitration signal (Arb_A, Arb_B) is decoded on the basis of the rule shown in the following Table 5 so that it is placed in line state.

TABLE 5A

Line State of Arbitration Signal Received at Physical Layer

| Interpolated Arbitration Signal | | Line State | |
|---|---|---|---|
| Arb_A | Arb_B | Name | Note |
| Z | Z | IDLE | PHY of connected adjacent node is inoperative. |
| Z | 0 | RX_PARENT_NOTIFY | PHY of connected adjacent node attempts to serve as child node |
| | | RX_REQUEST_CANCEL | PHY of connected adjacent node has abandoned a request |

TABLE 5B

Line State of Arbitration Signal Received at Physical Layer

| Interpolated Arbitration Signal | | Line State | |
|---|---|---|---|
| Arb_A | Arb_B | Name | Note |
| Z | 1 | RX_IDENT_DONE | PHY of child node has completed self-ID phase |
| 0 | Z | RX_SELF_ID_GRANT | PHY of parent node is granting the bus for self-ID |
| | | RX_REQUEST | PHY of child node is requesting the bus |

TABLE 5C

Line State of Arbitration Signal Received at Physical Layer

| Interpolated Arbitration Signal | | Line State | |
|---|---|---|---|
| Arb_A | Arb_B | Name | Note |
| 0 | 0 | RX_ROOT_CONTENTION | PHYs of this node and connected adjacent node both attempt to serve as child node |
| | | RX_GRANT | PHY of parent node is granting control of the bus |

TABLE 5D

Line State of Arbitration Signal Received at Physical Layer

| Interpolated Arbitration Signal | | Line State | |
|---|---|---|---|
| Arb_A | Arb_B | Name | Note |
| 0 | 1 | RX_PARENT_HANDSHAKE | PHY of connected adjacent node acknowledges PARENT NOTIFY |
| | | RX_DATA_END | PHY of connected adjacent node has completed transmission of data block to release bus |

TABLE 5E

Line State of Arbitration Signal Received at Physical Layer

| Interpolated Arbitration Signal | | Line State | |
|---|---|---|---|
| Arb_A | Arb_B | Name | Note |
| 1 | Z | RX_CHILD_HANDSHAKE | PHY of connected adjacent node acknowledges TX_CHILD_NOTIFY |
| 1 | 0 | RX_DATA_PREFIX | PHY of connected adjacent node attempts to transmit packet data, or has completed transmission of data block thereafter to transmit data |
| 1 | 1 | BUS_RESET | Transmitted to reconstruct bus |

In the above-described IEEE 1394 standard, there is provided the condition necessary as interface which connects or links civil equipments which handle image to computer. Accordingly, in general homes, various equipments such as audio equipment, visual equipment or personal computer, etc. are connected with ease by single cable, thereby making it possible to construct the network within the home. Thus, it becomes possible to operate various equipments with ease.

However, in the above-mentioned IEEE 1394 standard, since the distance between equipments to be connected, i.e., cable length between nodes is prescribed so that it is 4.5 m at the maximum, when attempt is made to construct network extending over, e.g., plural rooms even within the home, a large number of nodes only required for junction of cable must be provided.

In addition, when attempt is made to extend cable length without changing the system of the physical layer in the IEEE 1394 standard, cable must be thickened. As a result, not only working efficiency of laying (drawing) of cable for network, etc. is lowered, but also the cable itself becomes expensive.

DISCLOSURE OF THE INVENTION

In view of actual circumstances of the prior art as described above, an object of this invention is to provide an interface apparatus for digital serial data which has realized extension of cable length between nodes in the digital serial data interface which carries out arbitration of bus use right prior to transfer of data so that long distance transmission can be made.

This invention is directed to a data transmission apparatus which carries out transmission/reception of data and control codes, which comprises an input/output port, data converting processing means for converting data to be transmitted from n bit code to m bit code to output it to the input/output port, and for converting data received from the input/output port from m bit code to n bit code, and control signal converting processing means for converting a transmit control signal for acquiring use right of a transmission path connected to the input/output port into control code consisting of m bit code except for the m bit code allocated (assigned) to data to output it to the input/output port, and for converting control code of m bits received from the input/output port into a control signal.

In addition, this invention is directed to a data transmission method for carrying out transmission/reception of data and control code, which comprises a transmit data converting processing step of converting data to be transmitted from n bit code to m bit code to output it to an input/output port, receive data converting processing step of converting data received from the input/output port from m bit code to n bit code, a transmit control signal converting step of converting a transmit control signal for acquiring use right of a transmission path connected to the input/output port into control code consisting of m bit code except for m bit code allocated to data, and a receive control signal converting processing step of converting control code of m bits received from the input/output port into a control signal.

BEST MODE FOR CARRYING OUT THE INVENTION

Best mode for carrying out this invention will now be described in detail with reference to the attached drawings.

Figure 1:
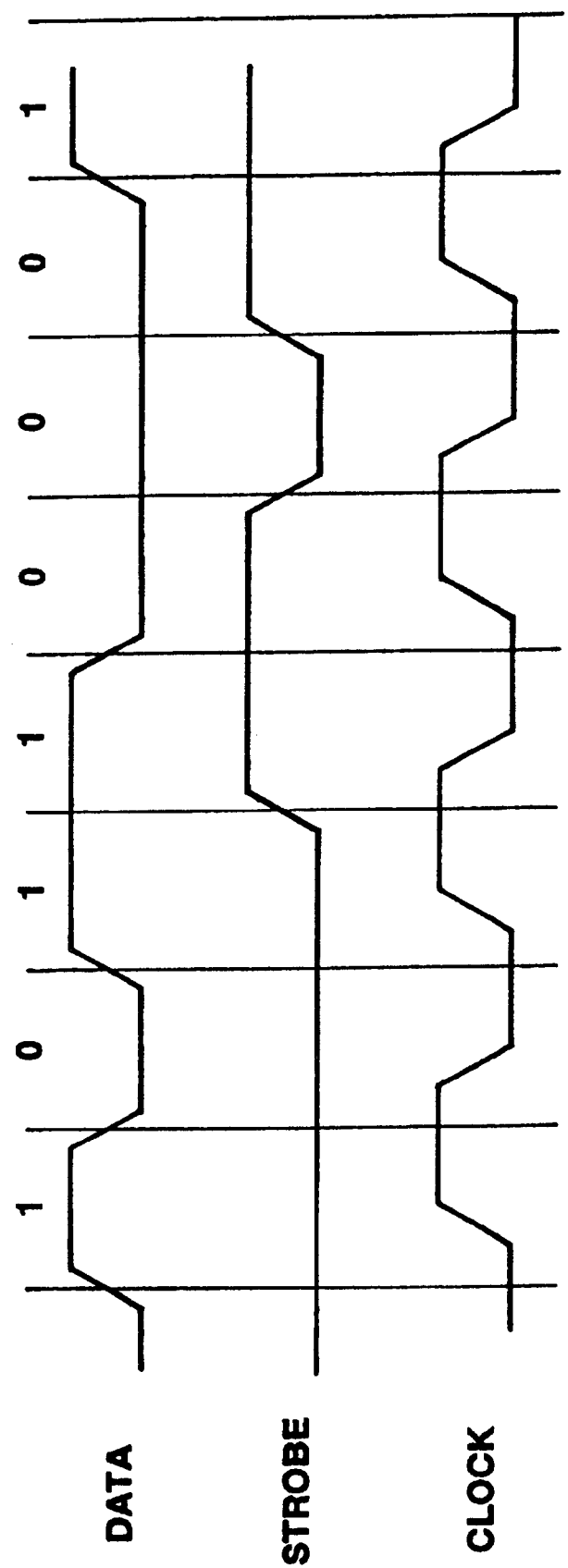
FIG. 1 is a time chart showing a signal configuration of transfer data in the IEEE 1394 standard.
Figure 2:
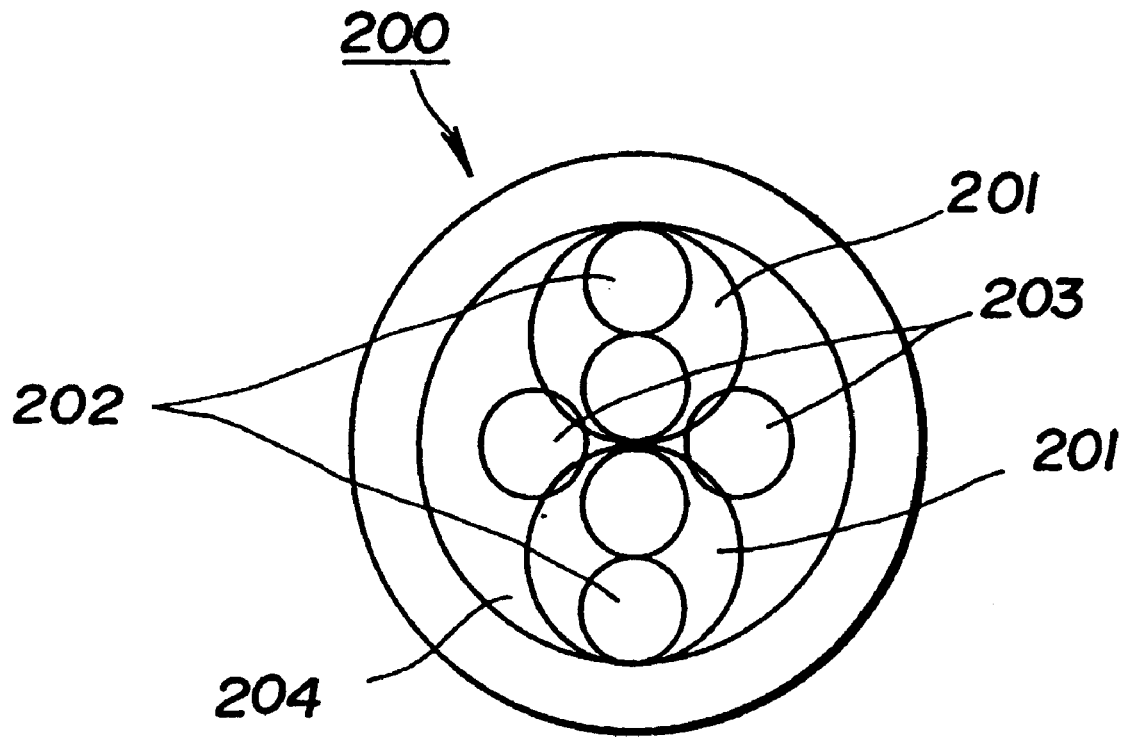
FIG. 2 is a cross sectional view of cable prescribed by the IEEE 1394 standard.
Figure 3:
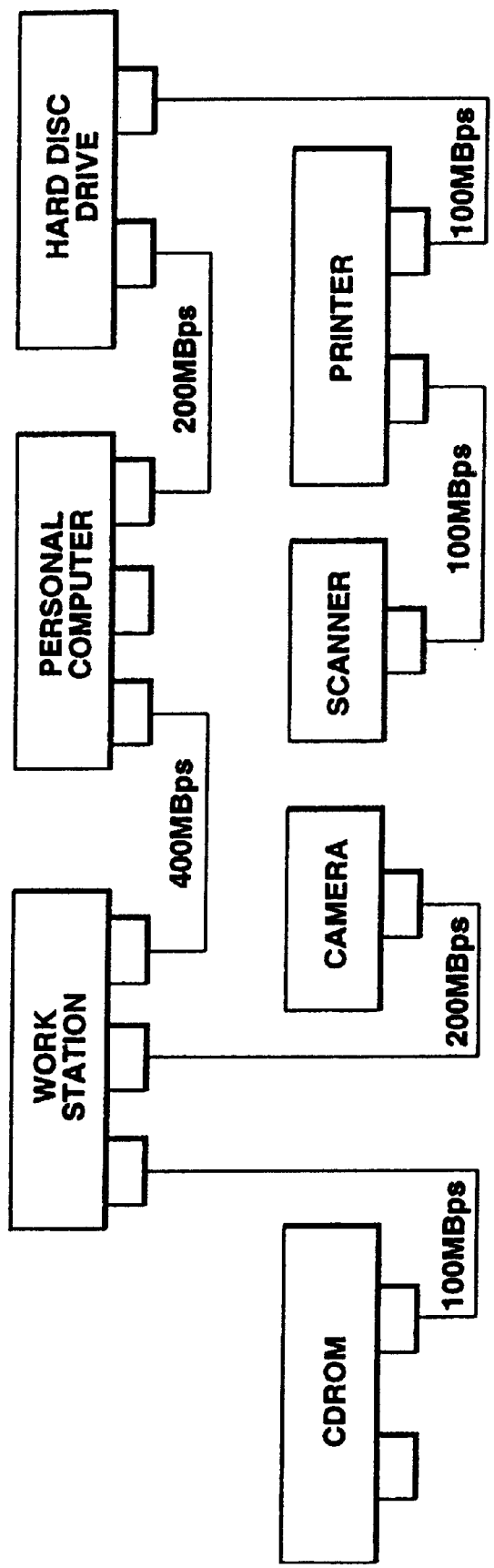
FIG. 3 is a view showing an example of the configuration of network employing the IEEE 1394 standard.
Figure 4:
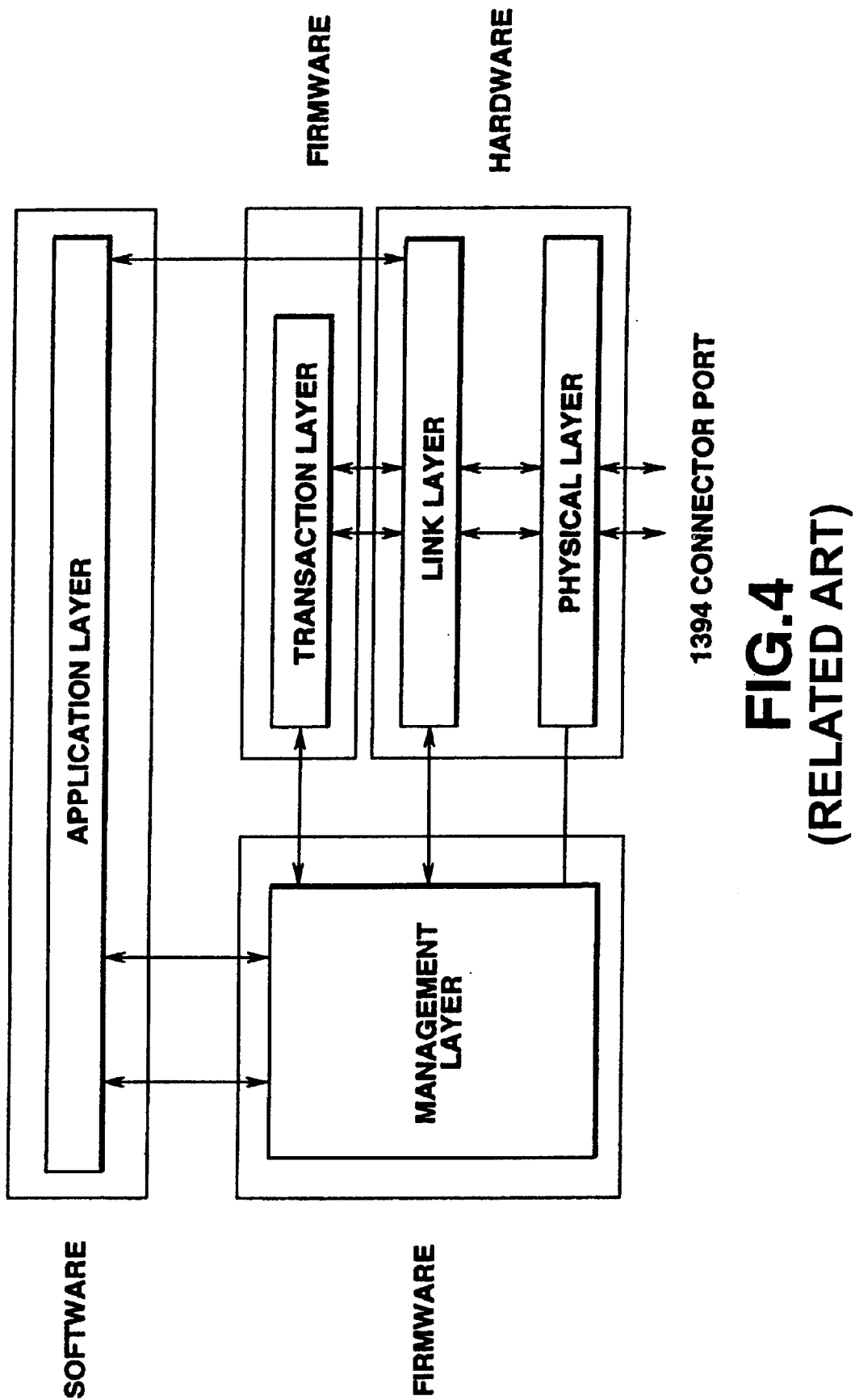
FIG. 4 is a view showing components and protocol architecture of interface in conformity with the IEEE 1394 standard.
Figure 5:
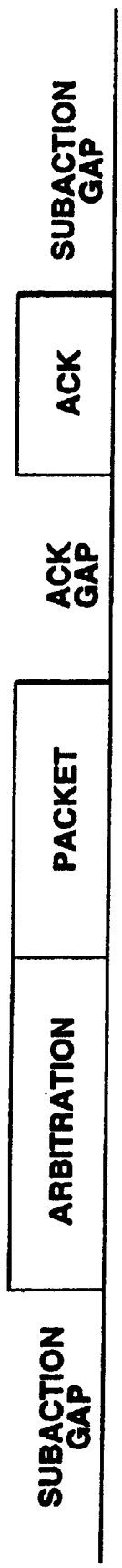
FIG. 5 is a view showing packet of asynchronous transfer.
Figures 6A, 6B:
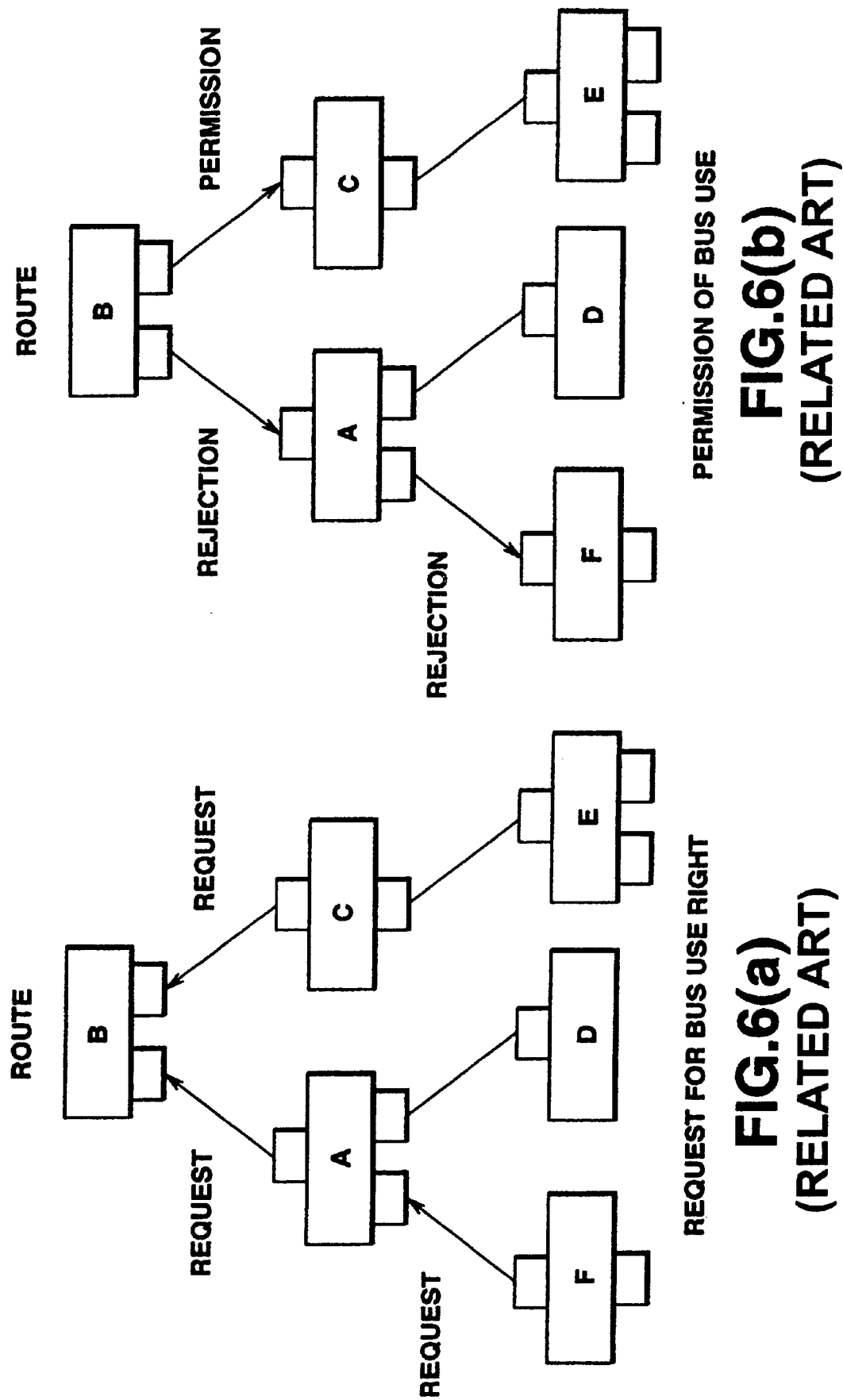
FIG. 6(*a*) and 6(*b*) are a view showing acquisition state of bus use right by arbitration.
Figure 7:
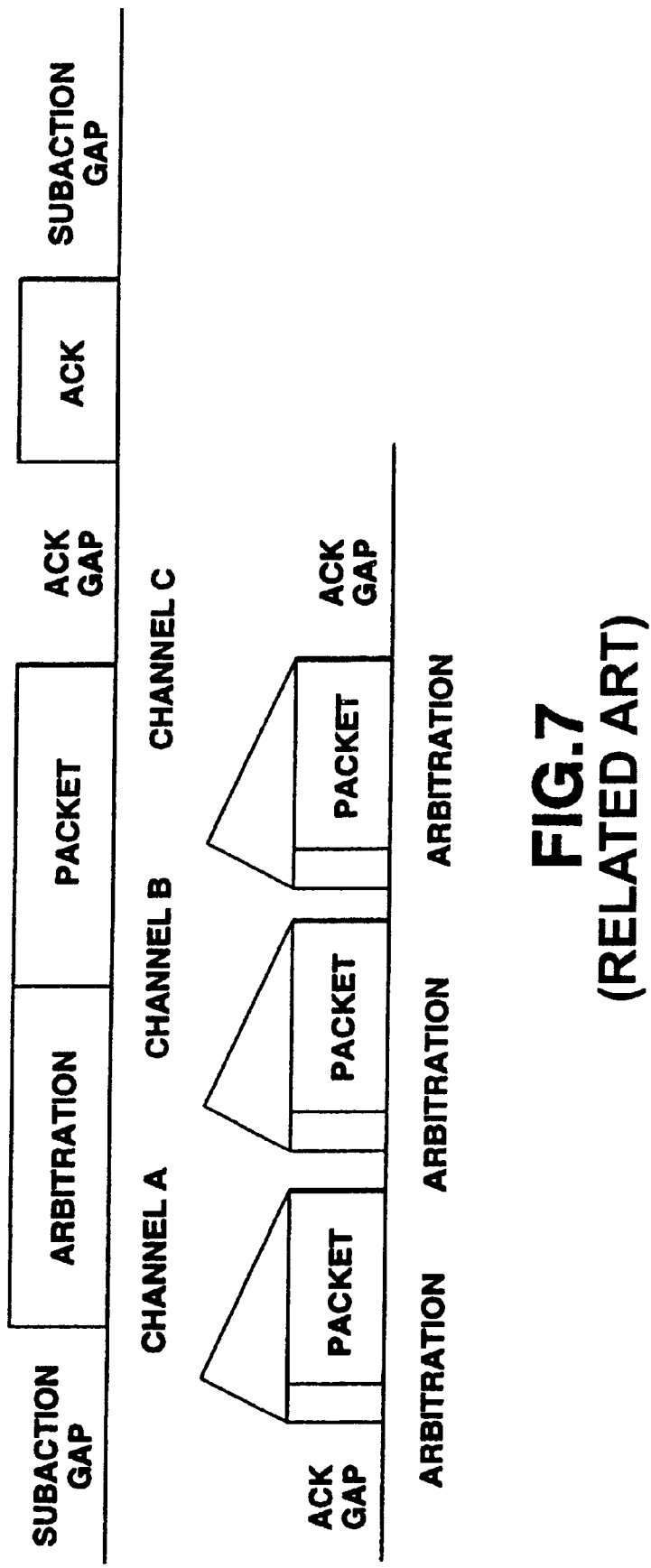
FIG. 7 is a view showing packet of isochronous transfer.
Figure 8:
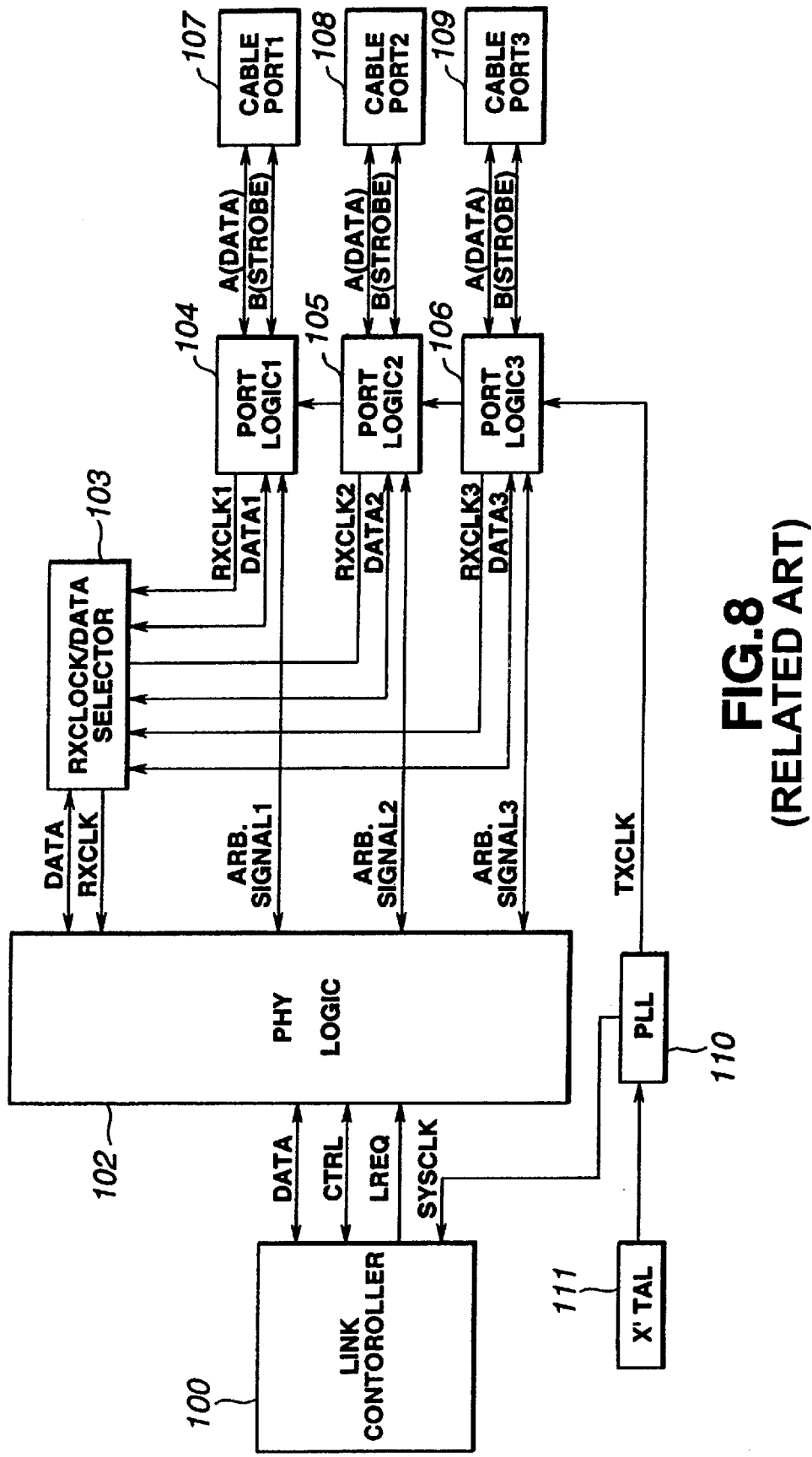
FIG. 8 is a block diagram showing an example of the actual configuration of physical layer in the IEEE 1394 standard.
Figure 9:
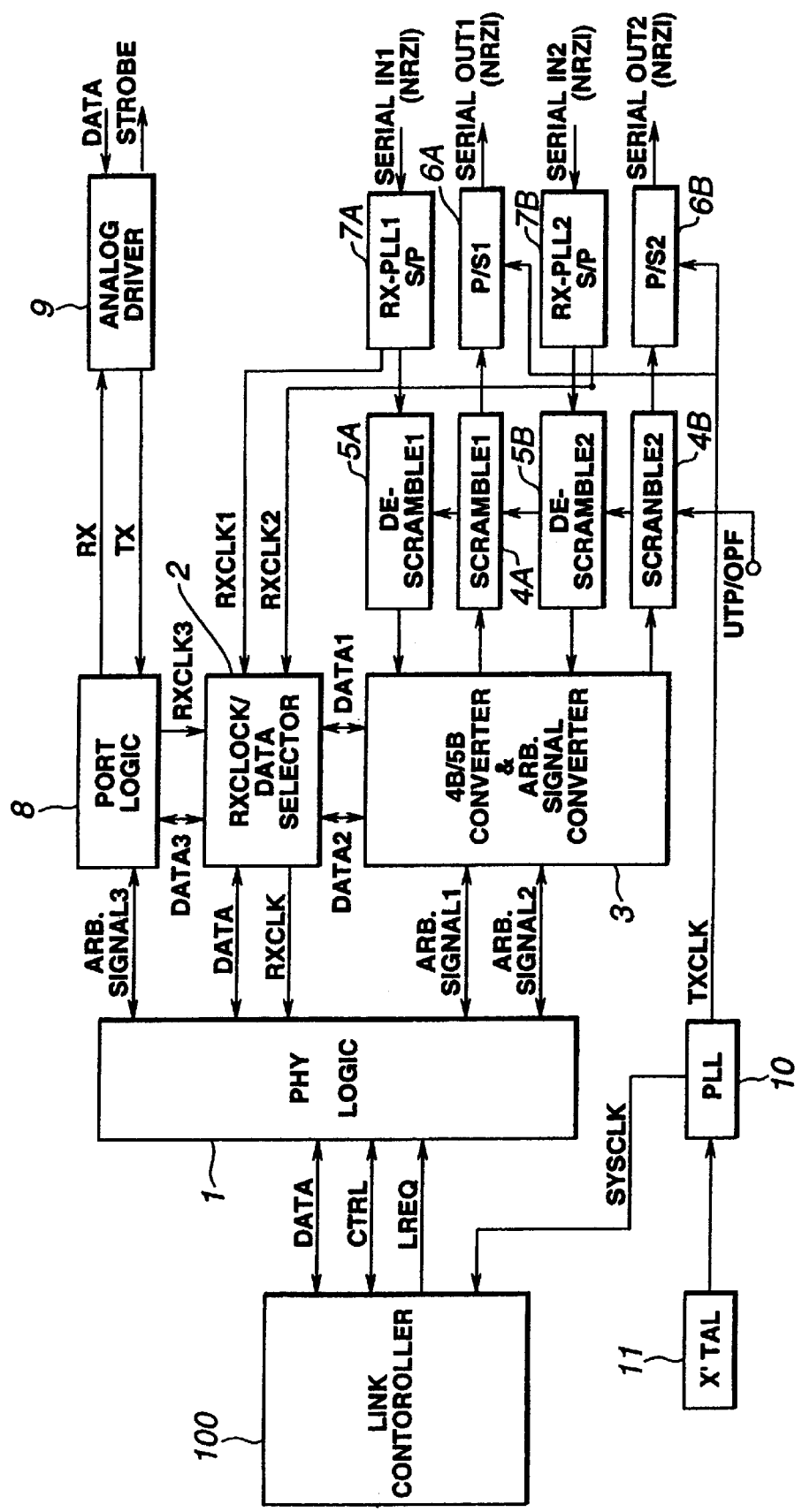
FIG. 9 is a block diagram showing an embodiment of an interface apparatus for digital serial data according to this invention.

The interface apparatus (unit) for digital serial data according to this invention is constituted as shown in FIG. 9, for example.

The interface unit shown in FIG. 9 comprises a physical layer logic block (PHY LOGIC) 1, a selector block (RXCLOCK/DATA SELECTOR) 2, a converting processing block (4 B/5 B CONVERTER & ARB. SIGNAL CONVERTER) 3, respective scramble blocks (SCRAMBLE1, SCRAMBLE2) 4A, 4, respective de-scramble blocks (DE-SCRAMBLE1, DE-SCRAMBLE2) 5A, 5B, respective transmitting blocks (P/S1, P/S2) 6A, 6B, respective receiving blocks (RX-PLL1, P/S, RX-PLL2 P/S) 7A, 7B, a port logic block (PORT LOGIC) 8, an analog driver (ANALOG DRIVER) 9, and a clock generating block (PLL) 10.

The physical layer logic block 1 serves to carry out I/O control and arbitration control with respect to the link layer in the IEEE 1394 high performance serial bus standard (hereinafter referred to as IEEE 1394 standard), and is connected to link layer controller 100 in conformity with the IEEE 1394 standard and is connected to the selector block 2, the converting processing block 3 and the port logic block 8.

In this example, I/O to and from the link layer in the physical layer logic block 1 is equivalent to the IEEE 1394 standard. Communication between the link layer and the physical layer is carried out by transmission/reception of data signal (DATA) and control signal (CTRL). In addition thereto, link request signal (LREQ) is inputted to the physical layer logic block 1 as transmit request from the link layer to the physical layer.

This physical layer logic block 1 includes therewithin arbitration controller, and serves to control arbitration process and transmission/reception to and from bus by the arbitration controller. When transmit request for packet is issued from the link layer, the physical logic block 1 starts arbitration after suitable gap time. In this case, the gap time differs in dependency upon kind of arbitrations. In addition, this physical layer logic block 1 sends, to the selector block 2, packet data (DATA) from the link layer to send arbitration request from the link layer to the converting processing block 3 and the port logic block 8.

The selector block 2 serves to select one set of data (DATA1, DATA2) and its receiving clock (RXCLK1, RXCLK2) received through the converting processing block 3, and data (DATA3) and its receiving clock (RXCLK3) received through the port logic block 8, and is connected to the physical layer logic block 1, the converting processing block 3, the respective receiving blocks 7A, 7B, and the port logic block 8.

In the case of transmission of data, this selector block 2 sends packet data (DATA) sent from the physical layer logic block 1 to the converting processing block 3 and the port logic block 8. Thus, transmit data is sent to all transmitting ports. Moreover, in the case of reception, the selector block 2 selects one set of packet data (DATA1, DATA2, DATA3) and their receiving clocks (RXCLK1, RXCLK2, RXCLK3) received through the converting processing block 3 or the port logic block 8 to send, e.g., packet data (DATA1) thus selected and its receiving clock (RXCLK1) to the physical layer logic block 1. Then, packet data selected by the selector block 2, e.g., packet data (DATA1) received at the converting processing block 3 is written into the FIFO memory within the physical layer logic block 1 by its receiving clock (RXCLK1). Packet data written into this FIFO memory is read out by system clock SYSCLK given by the clock generating block 10.

The converting processing block 3 functions as 4 bits/5 bits converting processing means of data, and functions as arbitration signal converting processing means for allocating (assigning) 5 bit symbol except for 5 bit symbol allocated to data in the 4 bits/5 bits converting processing to arbitration signal. At the time of arbitration, the converting processing block 3 converts arbitration signal (ARB. SIGNAL1, ARB. SIGNAL2) sent from the physical layer logic block 1 into one or two 5 bit symbols allocated (assigned) as shown in the Table 6 to send such one or two 5 bit symbols to the respective scramble blocks 4A, 4B. Namely, at the time of transmission, the converting processing block 3 carries out transmission in the state where, as shown in the Table 6, 1 symbol is assigned to respective arbitrations except for TX_DATA_PREFIX and BUS_RESET, 2 symbols (11000 10001) are assigned to TX_DATA_PREFIX, and 2 symbols (00000 11111) are assigned to BUS_RESET. In this case, the Table 6 in this embodiment corresponds to the Table 4 in the IEEE 1394 standard.

Simultaneously, the converting processing block 3 converts symbol of arbitration of 5 bits sent from respective de-scramble blocks 5A, 5B into signal corresponding to the arbitration state on the basis of the Table shown in the Table 7 to send it to the physical layer logic block 1. This conversion is carried out on the basis of received receiving symbol of 5 bits and transmitting symbol of 5 bits being transmitted from this port. As shown in the Table 5, in the arbitration already determined in the IEEE 1394 standard, there are some arbitrations dependent upon the transmitting state of arbitration signal between child and parent. For example, in the case where parent node and child node simultaneously issue TX_PARENT_NOTIFY to respective nodes, there results Arb_A_Tx=0, Arb_B_Tx=Z on the basis of the Table 4 in the IEEE 1394 standard, and there result Arb_A=0, Arb B=0 on the basis of the Table 3 in the respective nodes. Namely, there results a form such that signals transmitted from respective nodes are canceled. In the case of this embodiment, since transmission of digital serial signal is carried out through the twist pair line, such cancellation is not carried out. For this reason, there is employed a configuration to store in advance transmit symbol into the memory or the register within the converting processing block 3 to determine arbitration state on the basis of the transmit symbol thus stored and receive symbols sent from the descramble blocks 5A, 5B to output corresponding arbitration signal to the physical layer logic block 1. In this instance, with respect to the arbitration signal transmitted to the physical layer logic block 1, signals of 2 bits are assigned in order to indicate "1", "0", "Z" in correspondence with the IEEE 1394 standard to determine arbitration state corresponding to the transmit symbol and the receive symbols to generate arbitration signal on the basis of the Table 8 to send it to the physical layer block 1.

It is to be noted that there may be employed a configuration in which management of the state of the node is caused to be carried out on the basis of symbol transmitted into state machine (not shown) to thereby determine the arbitration state on the basis of the receive symbol and the state of node. In this case, the Table 7 in this embodiment corresponds to the Table 5 in the IEEE 1394 standard.

TABLE 6

Transmit Symbol Allocated to Arbitration

| Transmit Symbol | Arbitration State |
|---|---|
| 11111 | IDLE |
| 00100 | TX_REQUEST |
|  | TX_GRANT |
| 00101 | TX_PARENT_NOTIFY |
| 11000 10001 | TX_DATA_PREFIX |
| 00111 | TX_CHILD_NOTIFY |
|  | TX_IDENT_DONE |
| 01101 | TX_DATA_END |
| 00000 11111 | BUS_RESET |

TABLE 7

Arbitration Allocated to Received Symbol

| Receive Symbol | Transmit Symbol | Arbitration State |
|---|---|---|
| 11111 | 11111 | IDLE |
| 00101 | 11111 | RX_PARENT_NOTIFY |
| 11111 | 00100 | RX_REQUEST_CANCEL |
| 00111 | 11111 | RX_IDENT_DONE |
| 00100 | 11111 | RX_SELF_ID_GRANT |
| 00100 | 11111 | RX_REQUEST |
| 00101 | 00101 | RX_ROOT_CONTENTION |
| 00100 | 00100 | RX_GRANT |
| 00111 | 00101 | RX_PARENT_HANDSHAKE |
| 01101 | 11111 | RX_DATA_END |
| 11111 | 00111 | RX_CHILD_HANDSHAKE |
| 11000 10001 | 00100 | RX_DATA_PREFIX |
| 11000 10001 | 00111 | RX_DATA_PREFIX |
| 11000 10001 | 11111 | RX_DATA_PREFIX |
| 00000 11111 | (don't care) | BUS_RESET |

TABLE 8

Line State of Arbitration Signal Received at Physical Layer

| Arbitration State | Arbitration Signal | |
|---|---|---|
|  | Arb_A | Arb_B |
| IDLE | Z | Z |
| RX_PARENT_NOTIFY | Z | 0 |
| RX_REQUEST_CANCEL |  |  |
| RX_IDENT_DONE | Z | 1 |
| RX_SELF_ID_GRANT | 0 | Z |
| RX_REQUEST |  |  |
| RX_ROOT_CONTENTION | 0 | 0 |
| RX_GRANT |  |  |
| RX_PARENT_HANDSHAKE | 0 | 1 |
| RX_DATA_END |  |  |
| RX_CHILD_HANDSHAKE | 1 | Z |
| RX_DATA_PREFIX | 1 | 0 |
| BUS_RESET | 1 | 1 |

Moreover, at the time of transmission of packet data, the converting processing block 3 respectively converts packet data (DATA1, DATA2) sent through the selector block 2 from 4 bit signal to 5 bit signal assigned as shown in the Table 9 to send them to respective scramble blocks 4A, 4B. Simultaneously, the converting processing block 3 converts receive packet data of 5 bits sent from the respective de-scramble blocks 5A, 5B from 5 bit signal to 4 bit signal to send it to the selector block 2.

TABLE 9

Symbol allocated to Data

| Hexadecimal | Binary | Symbol |
|---|---|---|
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

In this case, in the 4 bit/5 bit converting processing in the above-mentioned converting processing block 3, symbols of 5 bits including the clock component to much degree are assigned to packet data (DATA1, DATA2). Thus, at the receiving side of packet data (DATA1, DATA2), it is possible to securely generate their receive clocks (RXCLK1, RXCLK2) from receiving signal by PLL.

Moreover, an approach is employed to allocate IDLE (11111), i.e., 5 bit symbol consisting of "11111" including clock information to the maximum degree to the idle state in the arbitration of the IEEE 1394 standard, thereby making it possible to securely execute arbitration while maintaining the lock state of PLL of the receiving side even in the idle state in the arbitration.

The respective scramble blocks 4A, 4B implement scramble processing using shift register to 5 bit transmit signal sent from the converting processing block 3 at the time of transmission of packet data to thereby reduce unnecessary radiation of 5 bit transmit signal. The 5 bit transmit signal to which scramble processing has been implemented by the respective scramble blocks 4A, 4B is sent to the transmitting blocks 6A, 6B.

Further, since symbols except for IDLE (11111), TX_DATA_PREFIX (11000 10001) and TX_DATA_END (01101) are such that their "0" of 2 bits are all located at the leading position, when symbol synchronization is carried out after serial/parallel conversion, if "0" of 2 bits is found out, it is assumed to be leading portion of symbol to allow 5 bits including that symbol to be 1 symbol, thus making it possible to determine (establish) respective arbitration signals. In this case, with respect to BUS_RESET (00000 11111), if continuous "0"s of 5 bits are received, the above-mentioned symbol is assumed to be determined or established without allowing for "0" of 2 bits.

In this case, the reason why 2 symbols of (00000 11111) are assigned to BUS_RESET is to lock PLL to further maintain lock state. If only 1 symbol of (00000) is assigned to BUS_RESET, it is impossible to lock PLL when BUS_RESET is received to maintain lock state. Moreover, in allocation of data and 5 bit symbol to the arbitration state, there are selected codes such that DC balance does not deviate and capable of locking PLL when they are converted into NRZI codes. However, since there is limitation in the number of symbols of 5 bits which can satisfy such condition, 2 symbols are combined, thereby making it possible to obtain codes which have satisfied such condition.

With respect to TX_DATA_PREFIX (11000 10001), detection thereof is carried out in a manner independent of other arbitration signals. Namely, such an approach is employed to shift received data by 1 bit to prepare five kinds of data trains (length: 10 bits) to compare it with bit pattern (11000 10001) of TX_DATA_PREFIX to determine or establish reception of TX_DATA_PREFIX if they coincide with each other. Since packet data are continuously received immediately after TX_DATA_PREFIX, it is possible to take symbol synchronization of packet data by reception of TX_DATA_PREFIX.

Moreover, since TX_DATA_END (01101) are continuously received immediately after packet data, detection thereof can be made by the same symbol synchronization as that of TX_DATA_PREFIX and packet data. In this case, since bit pattern (11000 10001) of TX_DATA_PREFIX is the pattern which does not appear in data train of packet data converted by the Table 9, even if symbol synchronization is not taken, there is no possibility that such pattern may be detected in the middle of packet data. As a result, erroneous reception of data does not take place. Further, after detection of TX_DATA_PREFIX, detections of arbitration signals except for TX_DATA_END and BUS_RESET are not carried out.

Further, respective de-scramble blocks 5A, 5B implement de-scramble processing corresponding to scramble processing by the scramble blocks 4A, 4B to 5 bit receiving signal sent from receiving Us blocks 7A, 7B to thereby release scramble of the 5 bit receiving signal. The 5 bit receiving signal of which scramble has been released by the respective descramble blocks 5A, 5B is sent to the converting processing block 3.

In this example, scramble blocks 4A, 4B and de-scramble blocks 5A, 5B are adapted so that ON/OFF operations of respective operations can be caused to switching setting.

Respective transmit blocks 6A, 6B convert 5 bit transmit signal to which scramble processing has been implemented by respective scramble blocks 4A, 4B from parallel data to serial data to further convert it from NRZ (Non Return to Zero) data to NRZI (Non Return to Zero Inverse) data to transmit it.

Moreover, the respective receiving blocks 7A, 7B convert receiving signal from NRZI data to NRZ data to further convert it from serial data to parallel data to send 5 bit receiving signal to the respective de-scramble blocks 5A, 5B. In addition, the respective receiving blocks 7A, 7B generate receiving clocks (RXCLK1, RXCLK2) by PLL from the received data to send it to the selector block 2.

The port logic block 8 serves to carry out transmission/reception of arbitration signal ARB.SIGNAL3 in conformity with the physical layer of the IEEE 1394 standard and data (DATA3), and generates receiving clock (RXCLK3) from data and its strobe signal sent through the analog driver 9. In addition, at the time of arbitration, arbitration signal (ARB. SIGNAL3) is sent from the physical layer logic block 1 to this port logic block 8.

Further, at the time of transmission of data, this port logic block 8 converts packet data (DATA3) sent through the selector block 2 from the physical layer logic block 1 into serial data by transmitting clock (TXCLK) given by the clock generating block 10 to transmit it through the analog driver 9.

Further, at the time of reception of data, this port logic block 8 sends packet data (DATA3) received through the analog driver 9 to the physical layer logic block 1 through the selector block 3 along with its receiving clock (RXCLK3). Further, in the case where this port logic block 8 is selected by the selector block 3, packet data (DATA3) is written into FIFO memory within the physical layer logic block 1 by its receiving clock (RXCLK3).

The clock generating block 10 generates, from clock of 24.576 MHz given by a crystal oscillator 11, system clock (SYSCLK) of 49.152 MHz and transmit clock (TXCLK) of 98.304 MHz.

In the interface unit for digital serial data constituted in this way, there is provided converting processing block 3 for carrying out 4 bit/5 bit converting processing with respect to arbitration signal (ARB. SIGNAL1, ARB. SIGNAL2) and packet data (DATA1, DATA2), thereby making it possible to carry out transmission/reception of arbitration signals (ARB.SIGNAL1, ARB.SIGNAL2) and packet data (DATA1, DATA2) as code data of 5 bits through respective transmitting blocks 6A, 6B and respective receiving blocks 7A, 7B. Thus, optical fiber cable or UTP (Unshielded Twisted Pair) cable available at low cost is used as transmission cable so that long distance transmission can be carried out. In addition, in this interface unit, port logic block 8 and analog driver 9 which are in conformity with the physical layer of the IEEE 1394 standard are further provided, whereby transmission path by cable in conformity with the IEEE 1394 standard and transmission path by optical fiber cable or UTP cable can coexist.

Figure 10:
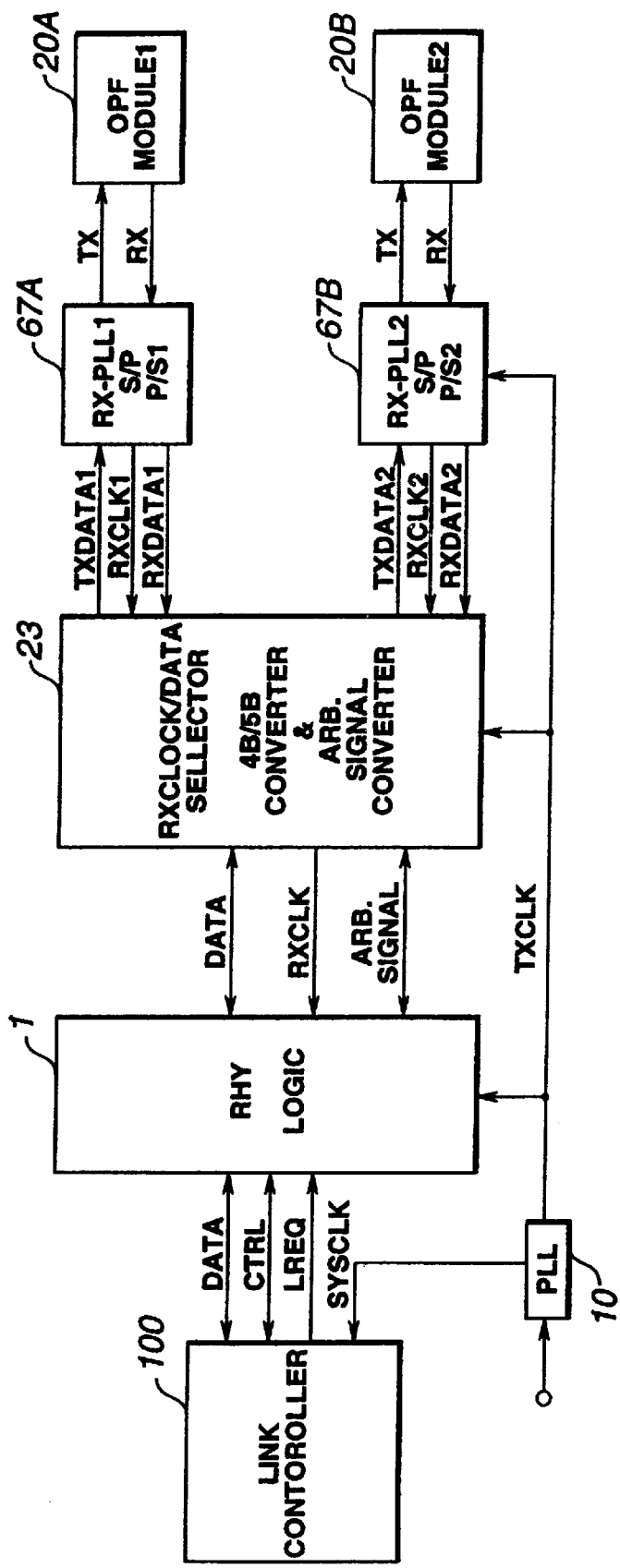
FIG. 10 is a block diagram showing another embodiment of the interface apparatus for digital serial data according to this invention.

Namely, as in the case of an interface unit of an embodiment shown in FIG. 10, for example, an optical connection module 20A is connected to a transmitting/receiving block 67A composed of the transmitting block 6A and the receiving block 7A in the above-described interface unit shown in FIG. 9, thereby making it possible to connect the optical fiber cable through the optical connection module 20A. Similarly, an optical connection module 20B is connected to a transmitting/receiving block 67B composed of the transmitting block 6B and the receiving block 7B, thereby making it possible to connect the optical fiber cable through this optical connection module 20B.

At the time of transmission of data, the optical connection modules 20A, 20B convert electric signals of NRZI from the transmitting/receiving blocks 67A, 67B into light signals to respectively send them to the optical fiber cable. In addition, at the time of reception of data, the optical connection modules 20A, 20B convert light signals sent through the optical fiber cable into electric signals of NRZI to respectively send them to the transmitting/receiving blocks 67A, 67B.

In this example, the interface unit in the embodiment shown in FIG. 10 is caused to be of a structure dedicated to connection by optical fiber cable in which the port logic block 8 and the analog driver 9 in the interface unit shown in FIG. 9 are omitted. In addition, the selector block (RXCLOCK/DATA SELECTOR) 2 and the converting processing block (4 B/5 B CONVERTER & ARB. SIGNAL CONVERTER) 3 are caused to serve as single signal processing block 23. In the case where the optical fiber cable is caused to be transmission path, unnecessary radiation does not take place. Accordingly, the scramble blocks (SCRAMBLE1, SCRAMBLE2) 4A, 4B and the de-scramble blocks (DE-SCRAMBLE1, DE-SCRAMBLE2) 5A, 5B are omitted.

Figure 11:
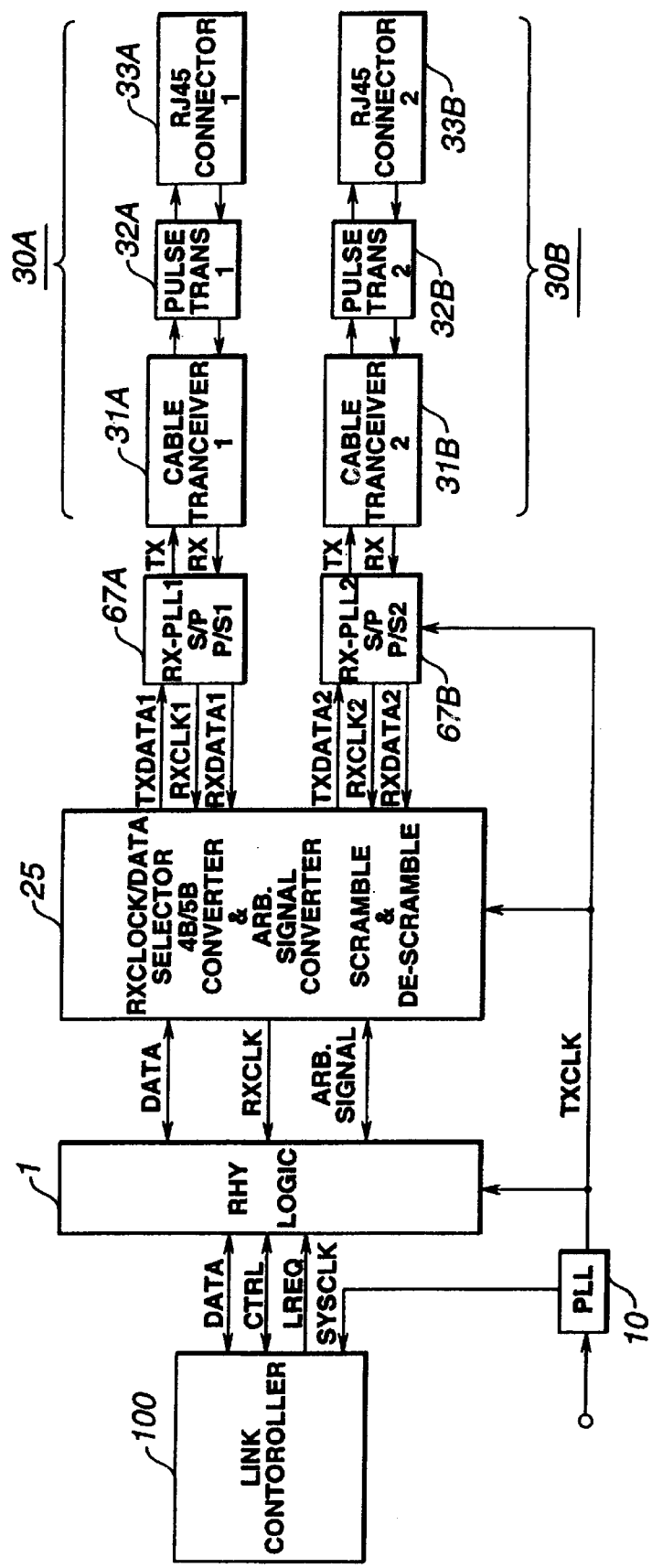
FIG. 11 is a block diagram showing a further embodiment of an interface apparatus for digital serial data according to this invention.

Moreover, as in the case of an interface unit of an embodiment shown in FIG. 11, for example, optical connection modules 20A, 20B in the above-described interface unit shown in FIG. 10 are replaced by UTP connection modules 30A, 30B, thereby making it possible to connect UTP cable. Namely, cable transceiver 31A is connected to the transmitting/receiving block 67A to connect a RJ45 connector 33A through a pulse transformer 32A to the cable transceiver 31A, thereby making it possible to connect UTP cable through the RJ45 connector 33A. Similarly, a cable transceiver 31B is connected to the transmitting/receiving block 67B to connect a RJ45 connector 33B for UTP cable connection through a pulse transformer 32B to the cable transceiver 31B, thereby making it possible to connect UTP cable through the RJ45 connector 33B.

As the cable transceivers 31A, 31B, e.g., ML6671 by Microlinear Company is used.

Further, at the time of transmission of data, the cable transceivers 31A, 31B convert NRZI signals from the transmitting/receiving blocks 67A, 67B into MLT-3 signals to send them to the pulse transformers 32A, 32B, respectively. Moreover, at the time of reception of data, the cable transceivers 31A, 31B convert MLT-3 signals sent through the pulse transformers 32A, 32B into NRZI signal to send them to the transmitting/receiving blocks 67A, 67B, respectively. In this case, the pulse transformers 32A, 32B serve to carry out interruption between the respective transceivers and the cable in terms of d.c.

In this example, the interface unit in the embodiment shown in FIG. 11 is caused to be dedicated to connection of UTP cable. Moreover, the selector block (RXCLOCK/DATA SELECTOR) 2, the converting processing blocks (4 B/5 B CONVERTER & ARB.SIGNAL CONVERTER) 3, the respective scramble blocks (SCRAMBLE1, SCRAMBLE2) 4A, 4B, and the respective de-scramble blocks (DE-SCRAMBLE1, DE-SCRAMBLE2) 5A, 5B are caused to serve as single signal processing block 25.

As described above, in the interface unit shown in FIG. 9, optical fiber cable or UTP cable is connected by exchange of the connection module, thus making it possible to carry out long distance transmission of digital serial data. Further, since the scramble blocks 4A, 4B and the de-scramble blocks 5A, 5B are adapted so that ON/OFF operations of respective operations can be caused to undergo switching setting, in the case where UTP cable is connected, the scramble blocks 4A, 4B and the de-scramble blocks 5A, 5B are caused to be turned ON, thereby making it possible to prevent unnecessary radiation.

The second embodiment will now be described.

While 1 symbol or 2 symbols are allocated to respective arbitration signals as shown in the Table 6 in the above-described embodiment, there may be employed an approach to add 2 symbols (11000 10001) as string delimiter for taking symbol synchronization of serial/parallel conversion at the receiving side before respective 5 bit symbols except for IDLE (11111) as shown in the Table 10, for example, thus to carry out transmission. In this case, at the time of reception, as shown in the Table 11, corresponding symbols are allocated to respective arbitration states by 10 bits in which receiving symbol and transmitting symbol are combined.

TABLE 10

Transmit Symbol Allocated to Arbitration

| Transmit Symbol | Arbitration |
|---|---|
| 11111 | IDLE |
| 11000 10001 00011 | TX_REQUEST |
| 11000 10001 00011 | TX_DRANT |

TABLE 10-continued

Transmit Symbol Allocated to Arbitration

| Transmit Symbol | Arbitration |
|---|---|
| 11000 10001 00101 | TX_PARENT_NOTIFY |
| 11000 10001 00110 | TX_DATA_PREFIX |
| 11000 10001 01100 | TX_CHILD_NOTIFY |
| 11000 10001 01100 | TX_IDENT_DONE |
| 11000 10001 11001 | TX_DATA_END |
| 11000 10001 00000 | BUS_RESET |

TABLE 11

Symbol Allocated to Arbitration

| Receive Symbol | Transmit Symbol | Arbitration |
|---|---|---|
| 11111 | 11111 | IDLE |
| 00101 | 11111 | RX_PARENT_NOTIFY |
| 11111 | 00011 | RX_REQUEST_CANCEL |
| 01100 | 11111 | RX_IDENT_DONE |
| 00011 | 11111 | RX_SELF_ID_GRANT |
| 00011 | 11111 | RX_REQUEST |
| 00101 | 00101 | RX_ROOT_CONTENTION |
| 00011 | 00011 | RX_GRANT |
| 01100 | 00101 | RX_PARENT_HANDSHAKE |
| 11001 | 11111 | RX_DATA_END |
| 11111 | 01100 | RX_CHILD_HANDSHAKE |
| 00110 | 00011 | RX_DATA_PREFIX |
| 00110 | 01100 | RX_DATA_PREFIX |
| 00110 | 11111 | RX_DATA_PREFIX |
| 00000 | (don't care) | BUS_RESET |

As stated above, the interface unit for digital serial data according to this invention is constituted. Namely, there are provided 4 bit/5 bit converting processing means for carrying out 4 bit/5 bit converting processing with respect to data, and arbitration signal converting processing means for allocating 5 bit symbol except for 5 bit symbol allocated to data in the 4 bit/5 bit converting processing to the arbitration signal, thereby making it possible to carry out transmission/reception of arbitration signal and packet data as code data of 5 bits. Thus, optical fiber cable or UTP cable available at low cost is used as transmission cable, thus making it possible to carry out long distance transmission.

Further, in the case where UTP cable is connected, scramble block and de-scramble block are caused to be in ON state, thereby making it possible to prevent unnecessary radiation.

Further, there may be employed an approach to switch, by selector means, operations of the 4 bit/5 bit converting processing means, the arbitration signal converting processing means, and the port logic constituting the physical layer in conformity with the IEEE 1394 high performance serial bus standard to carry out selection of data caused to undergo transmission/reception through the input/output port, whereby switching between the transmission path by cable in conformity with the IEEE 1394 standard and the transmission path by optical fiber cable or the UTP cable can be made.

In addition, in the interface apparatus for digital serial data according to this invention, there is employed such a scheme to allocate IDLE (11111), i.e., 5 bit symbol of "11111" including clock information to the maximum degree to the idle state in the arbitration of the IEEE 1394 standard, thereby making it possible to securely execute arbitration while maintaining the lock state of PLL at the receiving side even in the idle state in the arbitration.

What is claimed is:

1. A data transmission apparatus adapted for carrying out transmission/reception of data and control code, the data transmission apparatus comprising:

an input/output port;

data converting processing means for the converting the data to be transmitted from n bit code to m bit code and passing the resulting m bit code to the input/output port, and for converting the data received form the input/output port from m bit code to n bit code;

control signal converting processing means for converting a transmit control signal for arbitrating use of a non-crossbar switched transmission path connected to the input/output port into an arbitration control code comprising m bit code, except for m bit code allocated to the data to be transmitted, and passing the resulting arbitration control code to the input/output port, and for converting a received control code of m bits received from the input/output port into a received control signal.

2. A data transmission apparatus as set forth in claim 1, wherein n=4 and m=5.

3. A data transmission apparatus as set forth in claim 2, wherein the data converting processing means uses, as 5 bit codes, "11110", "01001", "10100", "10101", "01010", "01011", "01110", "01111", "10010", "10011", "10110", "10111", "11010", "11011", "11100", and "11101".

4. A data transmission apparatus as set forth in claim 1, wherein the control signal converting processing means carries out conversion into said m bit code in which values of a predetermined number of bits of the leading portion of the m bit code are the same.

5. A data transmission apparatus as set forth in claim 4, wherein the control signal converting processing means carries out conversion into said m bit code in which the leading portion of the m bit code has value of 2 bits of "00".

6. A data transmission apparatus as set forth in claim 1, wherein the control signal converting processing means converts an idle signal transmitted for a time period during which no data is transmitted into m bit code in which bit values "1" are continuous.

7. A data transmission apparatus as set forth in claim 1, wherein the control signal converting processing means converts said received control code into said received control signal by using said arbitration control code.

8. A data transmission apparatus as set forth in claim 1, wherein the control signal converting processing means converts a bus reset signal for resetting said transmission path connected to the input/output port into a bus reset control code in which m bit code is allocated by 2 symbols.

9. A data transmission apparatus as set forth in claim 8, wherein said bus reset control code comprises a first m bit code in which bit values "0" are continuous and a second m bit code in which bit values "1" are continuous.

10. A data transmission apparatus as set forth in claim 1, wherein the data to be transmitted and the transmit control signal are inputted from a link layer in conformity with the IEEE 1394 high performance serial bus standard.

11. A data transmission method for carrying out transmission/reception of data and control code, the data transmission method comprising:

a transmit data converting processing step of converting the data to be transmitted from n bit code to m bit code and passing the resulting m bit code to an input/output port;

a receive data converting processing step of converting the data received from the input/output port from m bit code to n bit code;

a transmit control signal converting processing step of converting a transmit control signal for arbitrating use of a non-crossbar switched transmission path connected to the input/output port into an arbitration control code comprising m bit code, except for m bit code allocated to the data to be transmitted; and a receive control signal converting processing step of converting a received arbitration control code of m bits received from the input/output port into a received control signal.

12. a data transmission method as set forth in claim 11, wherein n=4 and m=5.

13. A data transmission method as set forth in claim 12, wherein the transmit data converting processing step uses as 5 bit codes, "11110", "01001", "10100", "10101", "01010", "01011", "01110", "01111", "10010", "10011", "10110", "10111", "11010", "11011", "11100", and "11101".

14. A data transmission method as set forth in claim 11, wherein, the transmit control signal converting processing step carries out conversion into said m bit code in which values of a predetermined number of bits of the leading portion of the m bit code are the same.

15. A data transmission method as set forth in claim 14, wherein the transmit control signal converting processing step carries out conversion into said m bit code in which the leading portion of the m bit code has value of 2 bits of "00".

16. A data transmission method as set forth in claim 11, wherein the transmit control signal converting processing step converts an idle signal transmitted for a time period during which no data is transmitted into m bit code in which bit values "1" are continuous.

17. A data transmission method as set forth in claim 11, wherein at the receive control signal converting processing step, converting said received control code of m bits includes using said arbitration control code.

18. A data transmission method as set forth in claim 11, wherein the transmit control signal converting processing step converts a bus reset signal for resetting said transmission path connected to the input/output port into a bus reset control code in which m bit code is allocated by 2 symbols.

19. A data transmission method as set forth in claim 18, wherein said bus reset control code comprises a first m bit code in which bit values "0" are continuous and a second m bit code in which bit values "1" are continuous.

20. A data transmission apparatus adapted for carrying out transmission/reception of data and control code, comprising:

an input/output port;

a converting processing block: (a) for converting the data to be transmitted from said input/output port from n bit code to m bit code, wherein m>n, and passing the resulting m bit code to the input/output port, (b) for converting the data received from the input/output port from m bit code to n bit code, (c) for converting an arbitration signal arbitrating use of a non-crossbar switched transmission path connected to the input/ output port into an m bit arbitration control code, and (d) for converting an m bit received control code received from the input/output port into a received arbitration signal.

21. A data transmission apparatus as set forth in claim 20, wherein n=4 and m=5.

22. A data transmission apparatus as set forth in claim 21, wherein said converting processing block uses the following symbols as 5 bit codes: "11110", "01001", "10100", "10101", "01010", "01011", "01110", "01111", "10010", "10011", "10110", "10111", "11010", "11011", "11100", and "11101".

23. A data transmission apparatus as set forth in claim 20, wherein the m bit code has a leading portion and the converting processing block carries out conversion into said m bit code in which values of a predetermined number of bits of the leading portion of the m bit code are the same.

24. A data transmission apparatus as set forth in claim 23, wherein the converting processing block carries out conversion into said m bit code in which the leading 2 bits of the m bit code are "00".

25. A data transmission apparatus as set forth in claim 20, wherein the converting processing block converts an idle signal transmitted for a time period during which no data is transmitted into said m bit code in which all m bits are "1".

26. A data transmission apparatus as set forth in claim 20, wherein the converting processing block converts said m bit received control code into said received arbitration signal by using said m bit arbitration control code.

27. A data transmission apparatus as set forth in claim 20, wherein the converting processing block converts a bus reset signal for resetting the transmission path connected to the input/output port into 2 m bit bus reset control code symbols.

28. A data transmission apparatus as set forth in claim 27, wherein the converting processing block converts the bus reset signal into 2 m bit bus reset control code symbols including a first symbol in which all bit values are "0" and a second symbol in which all bit values are "1".

29. A data transmission apparatus as set forth in claim 20, wherein said data to be transmitted and said arbitration signal are inputted from a link layer in conformity with the IEEE 1394 high performance serial bus standard.

30. A data transmission apparatus adapted for carrying out transmission/reception of data and control code, the data transmission apparatus comprising:
an input/output port;
data converting processing means for converting the data to be transmitted from 4 bit code to 5 bit code and passing the resulting 5 bit code to the input/output port, and for converting the data received form the input/ output port from 5 bit code to 4 bit code, the 5 bit codes being "11110", "01001", "10100", "10101", "01010", "01011", "01110", "01111", "10010", "10011", "10110", "10111", "11010", "11011", "11100", and "11101";
control signal converting processing means for converting a transmit control signal for arbitrating use of a transmission path connected to the input/output port into an arbitration control code comprising 5 bit code, except for 5 bit code allocated to the data to be transmitted, for passing said arbitration control code to the input/output port, and for converting a received control code of 5 bits received from the input/output port into a received control signal.

31. A data transmission apparatus adapted for carrying out transmission/reception of data and control code, the data transmission apparatus comprising:
an input/output port;
data converting processing means for converting the data to be transmitted from n bit code to m bit code and passing the resulting m bit code to the input/output port, and for converting the data received form the input/ output port from m bit code to n bit code;
control signal converting processing means for converting a transmit control signal for arbitrating use of a transmission path connected to the input/output port into an arbitration control code comprising m bit code, except for m bit code allocated to the data to be transmitted, for passing said arbitration control code to the input/output port, and for converting a received control code of m bits received from the input/output port into a received control signal, the leading portion of the m bit code of the received control code including 2 bits of "00".

32. A data transmission apparatus adapted for carrying out transmission/reception of data and control code, the data transmission apparatus comprising:
an input/output port;
data converting processing means for converting the data to be transmitted from n bit code to m bit code and passing the resulting m bit code to the input/output port, and for converting the data received form the input/ output port from m bit code to n bit code;
control signal converting processing means for converting a transmit control signal for arbitrating use of a transmission path connected to the input/output port into an arbitration control code comprising m bit code, except for m bit code allocated to the data to be transmitted, for passing said arbitration control code to the input/output port, and for converting a received control code of m bits received from the input/output port into a received control signal, wherein the control signal converting processing means converts an idle signal transmitted for a time period during which no data is transmitted into m bit code in which bit values "1" are continuous.

33. A data transmission apparatus adapted for carrying out transmission/reception of data and control code, the data transmission apparatus comprising:
an input/output port;
data converting processing means for converting the data to be transmitted from n bit code to m bit code and passing the m bit code to the input/output port, and for converting the data received from the input/output port from m bit code to n bit code;
control signal converting processing means for converting a transmit control signal for arbitrating use of a non-crossbar switched transmission path connected to the input/output port into an arbitration control code comprising m bit code, except for m bit code allocated to the data to be transmitted, for passing said arbitration control code to the input/output port, and for converting a received control code of m bits received from the input/output port into a received control signal, wherein the control signal converting processing means converts a bus reset signal for resetting said transmission path connected to the input/output port into a bus reset control code in which m bit code is allocated by 2 symbols.

34. A data transmission apparatus as set forth in claim 33, wherein said bus reset control code comprises a first m bit code in which bit values "0" are continuous and a second m bit code in which bit values "1" are continuous.

35. A data transmission method for carrying out transmission/reception of data and control code, the data transmission method comprising:

a transmit data converting processing step of converting the data to be transmitted from 4 bit code to 5 bit code and for passing the resulting 5 bit code to an input/output port, the 5 bit codes being "11110", "01001", "10100", "10101", "01010", "01011", "01110", "01111", "10010", "10011", "10110", "10111", "11010", "11011", "11100", and "11101";

a receive data converting processing step of converting the data received from the input/output port from 5 bit code to 4 bit code;

a transmit control signal converting processing step of converting a transmit control signal for arbitrating use of a transmission path connected to the input/output port into an arbitration control code comprising 5 bit code, except for 5 bit code allocated to the data to be transmitted; and a receive control signal converting processing step of converting a received control code of 5 bits received from the input/output port into a received control signal.

36. A data transmission method for carrying out transmission/reception of data and control code, the data transmission method comprising:

a transmit data converting processing step of converting the data to be transmitted from n bit code to m bit code and passing the resulting m bit code to an input/output port;

a receive data converting processing step of converting the data received from the input/output port from m bit code to n bit code;

a transmit control signal converting processing step of converting a transmit control signal for arbitrating use of a transmission path connected to the input/output port into an arbitration control code comprising bit code, except for m bit code allocated to the data to be transmitted, the leading portion of the m bit arbitration control code having a value of 2 bits of "00"; and a receive control signal converting processing step of converting a received control code of m bits received from the input/output port into a received control signal.

37. A data transmission method for carrying out transmission/reception of data and control code, the data transmission method comprising:

a transmit data converting processing step of converting the data to be transmitted from n bit code to m bit code and passing the resulting m bit code to an input/output port;

a receive data converting processing step of converting the data received from the input/output port from m bit code to n bit code;

a transmit control signal converting processing step of converting a transmit control signal for arbitrating use of a transmission path connected to the input/output port into an arbitration control code comprising m bit code, except for m bit code allocated to the data to be transmitted, wherein the transmit control signal converting processing step converts an idle signal transmitted for a time period during which no data is transmitted into m bit code in which bit values "1" are continuous; and a receive control signal converting processing step of converting a received control code of m bits received from the input/output port into a received control signal.

38. A data transmission method for carrying out transmission/reception of data and control code, the data transmission method comprising:

a transmit data converting processing step of converting the data to be transmitted from n bit code to m bit code and passing the resulting m bit code to an input/output port;

a receive data converting processing step of converting the data received from the input/output port from m bit code to n bit code;

a transmit control signal converting processing step of converting a transmit control signal for arbitrating use of a transmission path connected to the input/output port into an arbitration control code comprising m bit code, except for m bit code allocated to the data to be transmitted, wherein the transmit control signal converting processing step converts a bus reset signal for resetting said transmission path connected to the input/output port into a bus reset control code in which m bit code is allocated by 2 symbols; and a receive control signal converting processing step of converting a received control code of m bits received from the input/output port into a received control signal.

39. A data transmission method as set forth in claim 38, wherein said bus reset control code comprises a first m bit code in which bit values "0" are continuous and a second m bit code in which bit values "1" are continuous.

40. A data transmission apparatus adapted for carrying out transmission/reception of data and control code, comprising:

an input/output port;

a converting processing block: (a) for converting the data to be transmitted from said input/output port from 4 bit code to 5 bit code, and passing the resulting 5 bit code to the input/output port, (b) for converting the data received from the input/output port from 5 bit code to 4 bit code, (c) for converting an arbitration signal arbitrating use of a transmission path connected to the input/output port into an 5 bit arbitration control code, and (d) for converting a 5 bit received arbitration control code received from the input/output port into a received arbitration signal;

wherein the 5 bit codes are "11110", "01001", "10100", "10101", "01010", "01011", "01110", "01111", "10010", "10011", "10110", "10111", "11010", "11011", "11100", and "11101".

41. A data transmission apparatus adapted for carrying out transmission/reception of data and control code, comprising:

an input/output port; and a converting processing block: (a) for converting the data to be transmitted from said input/output port from n bit code to m bit code, wherein m>n, and passing the resulting m bit code to the input/output port, (b) for converting the data received from the input/output port from m bit code to n bit code, (c) for converting an arbitration signal arbitrating use of a transmission path connected to the input/output port into an m bit arbitration control code, and (d) for converting an m bit received arbitration control code received from the input/output port into a received arbitration signal;

wherein the leading 2 bits of the m bit code are "00".

42. A data transmission apparatus adapted for carrying out transmission/reception of data and control code, comprising:

an input/output port;

a converting processing block: (a) for converting the data to be transmitted from said input/output port from n bit code to m bit code, wherein m>n, and passing the resulting m bit code to the input/output port, (b) for converting the data received from the input/output port from m bit code to n bit code, (c) for converting an arbitration signal arbitrating use of a transmission path connected to the input/output port into an m bit arbitration control code, and (d) for converting an m bit received arbitration control code received from the input/output port into a received arbitration signal;

wherein the converting processing block converts an idle signal transmitted for a time period during which no data is transmitted into m bit code in which all m bits are "1".

43. A data transmission apparatus adapted for carrying out transmission/reception of data and control code, comprising:

an input/output port;

a converting processing block: (a) for converting the data to be transmitted from said input/output port from n bit code to m bit code, wherein m>n, and passing the resulting m bit code to the input/output port, (b) for converting the data received from the input/output port from m bit code to n bit code, (c) for converting an arbitration signal arbitrating use of a transmission path connected to the input/output port into an m bit arbitration control code, and (d) for converting an m bit received arbitration control code received from the input/output port into a received arbitration signal;

wherein the converting processing block converts a bus reset signal for resetting the transmission path connected to the input/output port into 2 m bit bus reset control code symbols.

44. A data transmission apparatus adapted for carrying out transmission/reception of data and control code, comprising:

an input/output port;

a converting processing block: (a) for converting the data to be transmitted from said input/output port from n bit code to m bit code, wherein m>n, and passing the resulting m bit code to the input/output port, (b) for converting the data received from the input/output port from m bit code to n bit code, (c) for converting an arbitration signal arbitrating use of a transmission path connected to the input/output port into an m bit arbitration control code, and (d) for converting an m bit received arbitration control code received from the input/output port into a received arbitration signal by using said m bit arbitration control code;

wherein the converting processing block converts a bus reset signal into 2 m bit bus reset control code symbols including a first symbol in which all bit values are "0" and a second symbol in which all bit values are "1".

* * * * *